(12) United States Patent
Rosenberg et al.

(10) Patent No.: US 7,460,105 B2
(45) Date of Patent: *Dec. 2, 2008

(54) INTERFACE DEVICE FOR SENSING POSITION AND ORIENTATION AND OUTPUTTING FORCE FEEDBACK

(75) Inventors: Louis B. Rosenberg, Pleasanton, CA (US); Bernard G. Jackson, Mountain View, CA (US)

(73) Assignee: Immersion Corporation, San Jose, CA (US)

( * ) Notice: Subject to any disclaimer, the term of this patent is extended or adjusted under 35 U.S.C. 154(b) by 42 days.

This patent is subject to a terminal disclaimer.

(21) Appl. No.: 11/332,537

(22) Filed: Jan. 13, 2006

(65) Prior Publication Data
US 2006/0114223 A1 Jun. 1, 2006

Related U.S. Application Data

(63) Continuation of application No. 10/043,374, filed on Jan. 8, 2002, now Pat. No. 6,987,504, which is a continuation of application No. 09/511,413, filed on Feb. 23, 2000, now Pat. No. 6,366,273, which is a continuation of application No. 09/248,175, filed on Feb. 9, 1999, now Pat. No. 6,046,727, which is a continuation of application No. 08/784,198, filed on Jan. 15, 1997, now Pat. No. 5,880,714, which is a continuation of application No. 08/583,032, filed on Feb. 16, 1996, now Pat. No. 5,701,140, which is a continuation of application No. 08/092,974, filed as application No. PCT/US94/07851 on Jul. 12, 1994, now abandoned.

(51) Int. Cl.
*G09G 5/00* (2006.01)

(52) U.S. Cl. ..................... 345/156; 345/179

(58) Field of Classification Search ............ 345/156, 345/179, 180; 178/18.01–18.07, 19.01–19.05
See application file for complete search history.

(56) References Cited

U.S. PATENT DOCUMENTS 3,919,691 A * 11/1975 Noll ........................ 345/419
3,923,166 A 12/1975 Fletcher et al.
4,160,508 A 7/1979 Salisbury, Jr.

(Continued)

OTHER PUBLICATIONS

Rosenberg, Louis B. "Perceptual Decomposition of Virtual Haptic Surfaces", 1993, IEEE, p. 46-53.

(Continued)

*Primary Examiner*—Ricardo L Osorio
(74) *Attorney, Agent, or Firm*—Thelen LLP; David B. Ritchie (57) ABSTRACT

An interface device for use with a computer that provides locative data to a computer for tracking a user manipulatable physical object and provides feedback to the user through output forces. The physical object is movable in multiple degrees of freedom and is tracked by sensors for sensing the location and orientation of the object. A device processor can be responsive to the output of the sensors and can provide the host computer with information derived from the sensors. The host computer can provide images on a display where the computer responds to the provided sensor information and force feedback is correlated with the displayed images via force feedback commands from the host computer.

20 Claims, 9 Drawing Sheets

U.S. PATENT DOCUMENTS

| | | | |
|---|---|---|---|
| 4,510,574 | A | 4/1985 | Guittet et al. |
| 4,603,284 | A | 7/1986 | Perzley |
| 4,604,016 | A | 8/1986 | Joyce |
| 4,655,673 | A | 4/1987 | Hawkes |
| 4,794,551 | A | 12/1988 | Yoshida |
| 4,831,531 | A | 5/1989 | Adams et al. |
| 4,853,874 | A | 8/1989 | Iwamoto et al. |
| 4,878,374 | A | 11/1989 | Nelson |
| 4,888,538 | A | 12/1989 | Dimitrov et al. |
| 4,986,280 | A | 1/1991 | Marcus et al. |
| 5,007,300 | A | 4/1991 | Siva |
| 5,018,922 | A | 5/1991 | Yoshinada et al. |
| 5,019,761 | A | 5/1991 | Kraft |
| 5,038,089 | A | 8/1991 | Szakaly |
| 5,068,529 | A | 11/1991 | Ohno et al. |
| 5,116,180 | A | 5/1992 | Fung et al. |
| 5,146,566 | A * | 9/1992 | Hollis et al. ............... 710/73 |
| 5,148,377 | A | 9/1992 | McDonald |
| 5,193,963 | A * | 3/1993 | McAffee et al. ............ 414/5 |
| 5,220,260 | A * | 6/1993 | Schuler ................. 318/561 |
| 5,243,266 | A | 9/1993 | Kasagami et al. |
| 5,266,875 | A | 11/1993 | Slotine et al. |
| 5,389,865 | A * | 2/1995 | Jacobus et al. ......... 318/568.11 |
| 5,402,582 | A | 4/1995 | Raab |
| 5,412,880 | A | 5/1995 | Raab |
| 5,451,924 | A | 9/1995 | Massimino et al. |
| 5,466,213 | A | 11/1995 | Hogan et al. |
| 5,576,727 | A * | 11/1996 | Rosenberg et al. ......... 345/179 |
| 5,611,147 | A | 3/1997 | Raab |
| 5,629,594 | A | 5/1997 | Jacobus et al. |
| 5,701,140 | A | 12/1997 | Rosenberg et al. |
| 6,535,794 | B1 | 3/2003 | Raab |

OTHER PUBLICATIONS

Microsoft Sidewinder FF Wheel review, 1999, http:www.flgamers.com/fl/apanel/view_articles.php?id=4.

Bejczy, Antal K., et al., "Generalization of Bilateral Force-Reflecting Control of Manipulators," Proceedings Of Fourth CISM—IFToMM Symposium on Theory and Practice of Robots and Manipulators, Zaborow, Poland, Sep. 8-12, 1981, 14 pages.

Bejczy, Antal K. et al., "Universal Computer Control System (UCCS) For Space Telerobots," Proceedings 1987 IEEE International Conference On Robotics and Automation, vol. 1, pp. 318-324, 1987.

Bejczy, A. K. et al., "A Laboratory Breadboard System for Dual-Arm Teleoperation," Third Annual Workshop on Space Operations Automation and Robotics (Soar '89), Jul. 1989, 13 pages.

Bejczy, Antal K. et al., "Role of Computer Graphics in Space Telerobotics: Preview and Predictive Displays," Preprint: First international Symposium on Measurement and Control in Robotics, Houston, TX, Jun. 1990, 13 pages.

Bejczy, Antal K., "Sensors, Controls, and Man-Machine Interface for Advanced Teleoperation," Science, vol. 208, No. 4450, pp. 1327-1335, 1980.

Bejczy, A. K. et al., "Kinesthetic Coupling Between Operator and Remote Manipulator," International Computer Technology Conference, The American Society of Mechanical Engineers, San Francisco, CA, Aug. 12-15, 1980, 9 pages.

Howe, Robert D., "A Force-Reflecting Teleoperated Hand System for the Study of Tactile Sensing in Precision Manipulation," Proceedings of the 1992 IEEE International Conference on Robotics and Automation, vol. 2, 1992, pp. 1321-1326.

Jacobsen, Stephen C. et al., "High Performance, Dextrous Telerobotic Manipulator With Force Reflection," Intervention/ROV '91 Conference & Exposition, Hollywood, Florida, May 21-23, 1991, pp. 213-218.

Kim, Won S. et al. "Graphics Displays for Operator Aid in Telemanipulation," Proceedings of the IEEE International Conference on Systems, Man and Cybernetics, vol. 2, pp. 1059-1067, 1991.

Massimino, Michael J. et al, "Sensory Substitution For Force Feedback in Teleoperation," Presence: vol. 2, No. 4, 1993 , pp. 344-352.

McAffee, Douglas A. et al, "Teleoperator Subsystem/Telerobot Demonstrator: Force Reflecting Hand Controller Equipment Manual," JPL D-5172, Jet Propulsion Laboratory, California Institute of Technology, Pasadena, CA, Jan. 1988, pp. 1-C36.

Yamakita, M. et al., "Tele Virtual Reality of Dynamic Mechanical Model," Proceedings of the 1992 IEEE/RSJ International Conference on Intelligent Robots and Systems, oJul. 7-10, 1992, pp. 1103-1110.

* cited by examiner

INTERFACE DEVICE FOR SENSING POSITION AND ORIENTATION AND OUTPUTTING FORCE FEEDBACK

CROSS-REFERENCE TO RELATED APPLICATIONS

This application is a continuation of U.S. application Ser. No. 10/043,374, filed Jan. 8, 2002 now U.S. Pat. No. 6,987,504, which is a continuation of U.S. application Ser. No. 09/511,413, filed Feb. 23, 2000 now U.S. Pat. No. 6,366,273, which is a continuation of U.S. application Ser. No. 09/248,175, now U.S. Pat. No. 6,046,727, filed on Feb. 9, 1999, which is a continuation of U.S. application Ser. No. 08/784,198, now U.S. Pat. No. 5,880,714, filed on Jan. 15, 1997, which is a continuation of application Ser. No. 08/583,032, filed Feb. 16, 1996, and which issued as U.S. Pat. No. 5,701,140, which was the National Stage of International Application No. PCT/US94/07851, filed Jul. 12, 1994, which is a continuation of application Ser. No. 08/092,974, filed Jul. 16, 1993, abandoned.

FIELD OF THE INVENTION

The present invention relates to a computer-human interface device, and more particularly it relates to a stylus coupled to a supportable mechanical linkage for providing and receiving commands to and from a computer.

BACKGROUND OF THE INVENTION

As the use of Computer Aided Design (CAD) Systems becomes more widespread, the need for cursor and command control devices which accurately and easily track three-dimensional position or motion is also growing. Devices which allow users to control a cursor with three-dimensional position and/or orientation commands are available for various applications. Among them are many hand-held input devices which allow users to interact with a host processor by controlling the position of a cursor or manipulating graphic objects on a computer screen. While these devices allow three-dimensional information to be transmitted to a computer they do not allow the user to use gestures and motions which are natural to the user.

For example, a prior art device of the type which is used for three-dimensional control involves the use of accelerometers to transduce the position and orientation of a stylus in space as described in U.S. Pat. No. 4,839,838. This device makes no provisions so the stylus can be grasped in a manner which makes use of finger dexterity nor does it include mechanical support to reduce fatigue or enhance user control or dexterity.

Another prior art example is an ultrasonic position-locating device like the one shown in U.S. Pat. No. 5,142,506. This device transduces position and orientation by triangulating ultrasonic signals. As with the prior art previously described, this device uses a free-floating stylus which includes no provisions for mechanical support to reduce fatigue or enhance user control or dexterity. Furthermore, this device is used with a stylus that is grasped in the palm of the hand. The use of such a stylus precludes fine positioning with the fingers and greatly reduces the dexterity of the user to manipulate position and orientation. In addition, this device is used with digital buttons on the stylus to send to the computer command signals. A button of this type is commonly called a "clicker" on a "mouse." Because such buttons are mechanically coupled to the free-floating stylus, it is difficult to push the buttons while maintaining the position and orientation of the stylus. By pushing down on the button, the user will necessarily move the stylus from its desired position. Accordingly, these commands are difficult to control under many circumstances.

SUMMARY OF THE INVENTION

In the present invention, the user holds a stylus which is supported by a support apparatus on a fixed surface so that the user can easily manipulate the stylus in free space to interact with a computer. The three-dimensional motion of the user is translated through the stylus and mechanical linkage to a processor which communicates with the computer, thus allowing commands to be sent to the computer which track the three-dimensional motion of the user. Therefore, cursor control in three-dimensions on the two-dimensional computer screen is possible.

In one embodiment, the stylus is supportable on a fixed surface by a set of mechanical linkages which include individual components joined together by a sufficient number of joints to allow several degrees of freedom in the motion of the stylus. These mechanical linkages provide mechanical leverage, friction, counter-weighing, and/or spring resistance in order to reduce fatigue of the user and to provide support to enhance the stability and dexterity of user manipulation of the stylus.

An embodiment of the present invention includes computer software and hardware which will provide force feedback information from the computer to the stylus. The computer sends feedback signals to the mechanical linkage which has force generators for generating force in response to images depicted on the computer screen. Incoming commands from the host computer are monitored by the microprocessor and instruct the microprocessor to report forces felt by a joint or set forces on a joint of the mechanical linkage.

In the aforementioned embodiment of the present invention, the joints of the mechanical linkages are coupled to sensors which provide information about their position. Such information is transmitted to a microprocessor so that position and orientation of the stylus can be computed using kinematic equations associated with or related to the particular linkage system. In another embodiment, position and orientation of the stylus is sensed through the use of ultrasonic, magnetic, or optical position and orientation sensors mounted on the stylus.

An embodiment of the present invention includes computer software and hardware which will provide force feedback information from the computer to the stylus. The computer sends feedback signals to the mechanical linkage which has force generators for generating force in response to images depicted on the computer screen. Incoming commands from the host computer are monitored by the microprocessor and instruct the microprocessor to report forces felt by a joint or set forces on a joint of the mechanical linkage.

Another aspect of the present invention includes a remote control unit which is used in place of a command clicker on the stylus. For example, a foot pedal or handheld unit for the user's opposite hand is included to provide command control to the computer. Accordingly, manual dexterity of stylus manipulation is not compromised.

DESCRIPTION OF PREFERRED EMBODIMENTS

Figure 1:
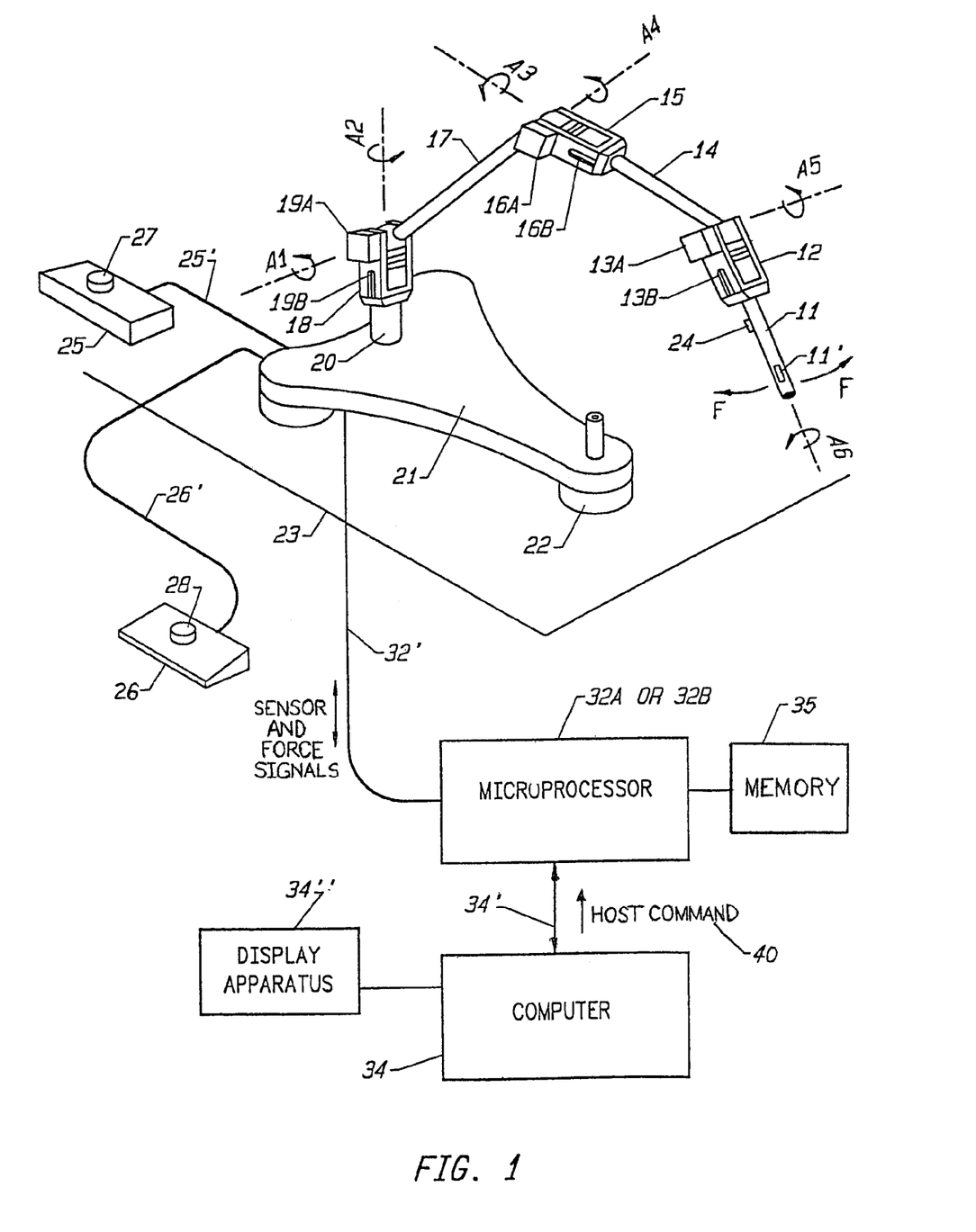
FIG. 1 is a perspective view of an embodiment of the present invention.

Referring to FIG. 1, a stylus 11 is shown attached to a support apparatus which is, in turn, supported on a fixed surface. By electrical and electronic configurations described below, the stylus 11 is adapted to provide data from which a computer or other computing means such as a microprocessor can ascertain the position and orientation of the stylus as it moves in three-dimensional space. This information is then translated to an image on a computer display apparatus. The stylus 11 may be used, for example, by an operator to change the position of a cursor on a computer controlled display screen by changing the position and/or orientation of the stylus, the computer being programmed to change the position of the cursor in proportion to the change in position and/or orientation of the stylus. In other words, the stylus 11 is moved through space by the user to designate to the computer how or where to move the cursor on a computer display apparatus.

Also contemplated in the present invention is computer software and hardware which will provide feedback information from the computer to the stylus and cause forces on the stylus. This implementation is described in greater detail subsequently.

The stylus 11 is a pen-like stick which can be manipulated between the fingers, allowing for much better control and fine dexterity as compared to full hand grips or palm-supported styluses used by some prior art inventions. While the stylus 11 is described in terms of manual manipulation, other stylus configurations are envisioned by the present invention. In particular, this invention includes manipulation by those unable to manually manipulate a pen. A stylus of the present invention, need not be linear, but may be curved or angled so that it may be held, for example, by the foot or the mouth of a person.

Because the stylus is supported by a support apparatus which is in turn supported by a fixed surface or other stabilizing configuration, the user can manipulate the stylus with a minimum of effort. Also, if the user chooses to discontinue using the stylus, it is capable of maintaining its position in space, unattended. While FIG. 1 shows that preferred embodiment of the present invention, FIGS. 5-8 show alternative embodiments, such which are also contemplated under the present invention. It is preferable that the stylus have enough degrees of freedom to enable it to move through the mechanical linkage to give the user the amount of flexibility needed to move the cursor as desired. In FIG. 1, six degrees of freedom are shown and are labeled as Axes A1, A2, A3, A4, A5, and A6. This, of course, provides maximum flexibility. Fewer degrees of freedom, such as a plurality of degrees of freedom, may also be sufficient depending on the application.

In one embodiment, the stylus is connected to rigid individual components which are joined together by joints. While not shown, other types of support apparatus' are included in the present invention. For example, other configurations include a semi-flexible rod or any other moveable while supportive configuration which can support the stylus in the manner described herein.

In FIG. 1, a mechanical linkage pursuant to the present invention is depicted. The stylus 11 is coupled to supportable mechanical linkages via joint 12 which, in the shown embodiment, houses sensors 13A and 13B. Linkage 14, is connected, via joint 15 having position sensors 16A and 16B, to linkage 17. Joint 18 in turn connects linkage 17 with the vertical base protrusion 20 which emanates from the base 21. The sensors are used to produce a stylus locative signal which is responsive to and corresponds with the position of the stylus at any point in time during its normal operation. The stylus locative signal is used to provide information for use by a computer display apparatus of a computer. The term "joint" as used herein is intended to mean the connection mechanism between individual linkage components. In fact, two separate moveable members can be joined; such together forming a joint.

The base 21, if necessarily, can be immobilized by securing it onto the fixed surface 23 by way of bolt, screw or other attachment mechanism 22. Moreover, the present invention implements mechanical leverage and rubbing friction (not shown) between the supportable mechanical linkages 1 and 17 and the joints 12, 15 and 18 in order to provide resistance and support so as to allow better dexterity than can be achieved with free-floating stylus trackers. This support and leverage aids in reducing the fatigue associated with manipulating the free-floating stylus 11.

As mentioned above, attached to each joint 12, 15 and 18 are sensors 13A, 13B, 16A, 16B, 19A, and 19B, respectively. These sensors sense the angle differential before and after motion of the two segments connected by that joint. The sensors can be, for example, optical incremental encoders, optical absolute encoders and potentiometers. Because the three-dimensional position and/or orientation tracking is achieved mechanically, this preferred embodiment avoids problems that magnetic and ultrasonic sensors, such as those shown in the prior art, encounter with metal and shadowing. However, as shown in FIG. 1, if desired, sensing means can be used to track the position and/or orientation of the stylus by mounting a single or several orientation sensors in the stylus 11 itself, such referred to as a stylus mounted sensor 11'. An ultrasound, magnetic, optical or position and orientation sensor can be used as the stylus mounted sensor 11'.

FIG. 1 also shows a clicker button 24 on stylus 11. The button is connected to a switch which when in the on state, sends a signal to the computer giving it a command. In order to provide for accuracy when sending commands, this invention also includes a remote clicker unit. Therefore, since the clicking motion occurs at a distant location from the cursor control, there is little or no opportunity to accidently move the cursor while making a command. FIG. 1 shows two configurations for implementing this aspect of the present invention. The first is identified as an alternate hand-clicker 25, the second as foot pedal 26.

Digital buttons 27 and 28 which are connected to switches (not shown) on the remote attached peripherals such as a hand-held clicker unit 25 or a foot pedal 26, respectively, can generate additional digital input such transmitted through lines 25' and 26' respectively. Either of the shown ancillary remote command units, such including the hand unit 25 and the foot pedal 26 configurations, are favorable methods of inputting digital commands by command hardware or software (not shown) because pressing the button 27 or 28 does not compromise a user's ability to hold the stylus steady whereas pressing any button 24 on the stylus does compromise stylus stability.

Figure 2A:
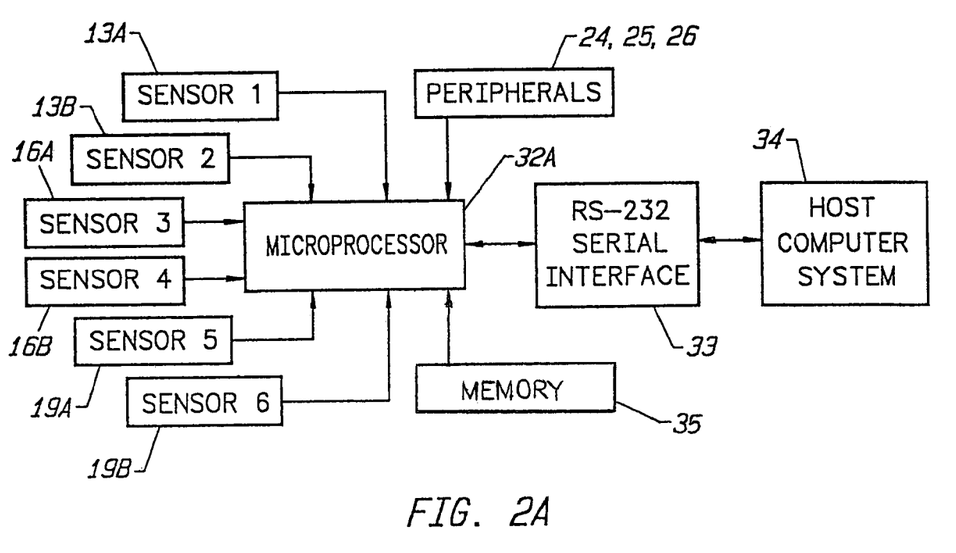
FIGS. 2A and 2B are block diagrams over-viewing two different electronic hardware configurations of the present invention.
Figure 2B:
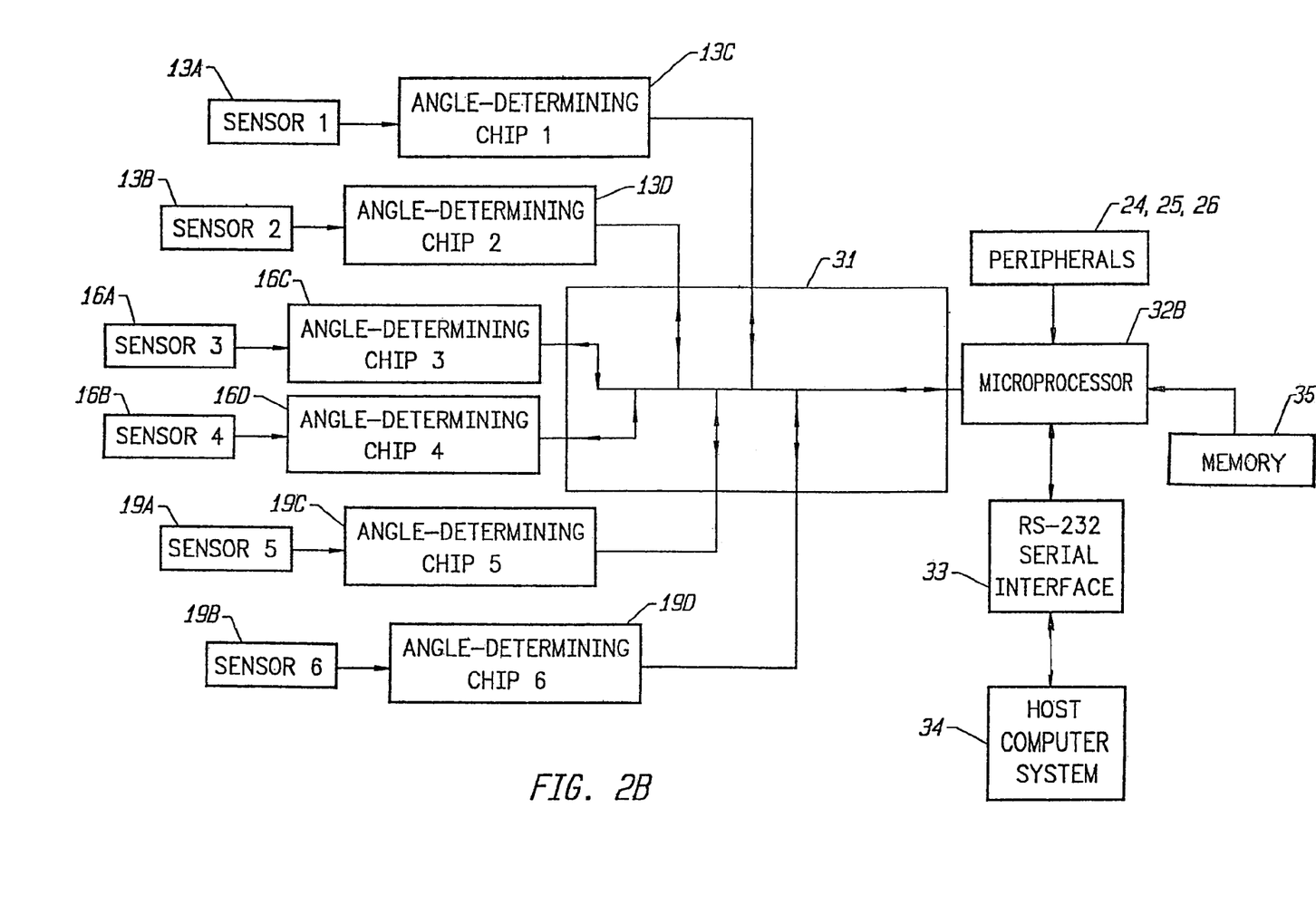

Referring to FIG. 2A, the sensors 13A, 13B, 16A, 16B, 19A and 19B, along with any peripherals 24, 25, or 26, can send their digital signals directly to a versatile floating-point processor or microprocessor 32A which is controlled by software stored in a digital ROM (Read-Only Memory) 35 via transmission line 32' or another form of transmission, i.e., radio signals. As shown in FIG. 2B, an alternative embodiment can be used to lessen the demands on the floating-point processor or microprocessor 32B. The digital inputs of the sensors 13A, 13B, 16A, 16B, 19A and 19B can be sent indirectly to the floating-point processor or microprocessor 32B by way of dedicated chips 13C, 13D, 16C, 16D, 19C and 19D, which pre-process the angle sensors' signals before sending them via bus 31 to the floating-point processor or microprocessor 32B which would combine these signals with those from the peripherals 24, 25 or 26. An 8-bit data bus plus chip-enable lines allow any of the angle determining chips to communicate with the microprocessor. Moreover, reporting the status of peripherals 24, 25 or 26 includes reading the appropriate digital switch and placing its status in the output sequence array. Some examples of specific electronic hardware usable for sensor pre-processing include quadrature counters, which are common dedicated chips that continually read the output of an optical incremental encoder and determine an angle from it, Gray decoders, filters, and ROM look-up tables.

The single-chip configuration of FIG. 2A is most applicable where the angle sensors 13A, 13B, 16A, 16B, 19A and 19B are absolute sensors, which have output signals directly indicating the angles without any further processing, thereby requiring less computation for the microprocessor 32A and thus little if any pre-processing. The multi-chip configuration of FIG. 2B is most applicable if the sensors 13A, 13B, 16A, 16B, 19A and 19B are relative sensors, which indicate only the change in an angle and which require further processing for complete determination of the angle.

In either configuration, if the microprocessor 32A or 32B is fast enough, it will compute stylus 11 position and/or orientation (or motion, if desired) on board the embodiment and send this final data through any standard communications interface such as an RS-232 serial interface 33 on to the host computer system 34 and to computer display apparatus 34" through transmission line 34' or another form of transmission. If the microprocessor 32A or 32B is not fast enough, then the angles will be sent to the host computer 34 which will perform these calculations on its own.

In addition to the single-chip and multi-chip configurations, a variation may consist of a single microprocessor which reads the peripherals, obtains the angles, possibly computes coordinates and orientation of the stylus 11, and supervises communication with the host computer 34. Another variation may consist of dedicated subcircuits and specialized or off-the-shelf chips which reads the peripherals, monitors the angle sensors 13A, 13B, 16A, 16B, 19A and 19B, determine the joint angles, and handle communications with the host computer 34, all without software or a microprocessor 32A or 32B.

Software is only included in the two microprocessor-based configurations shown in FIGS. 2A and 2B. The more dedicated hardware a given configuration includes, the less software it requires. The software consists of a main loop (FIG. 3) and an output interrupt (FIGS. 4A and 4B).

Figure 3:
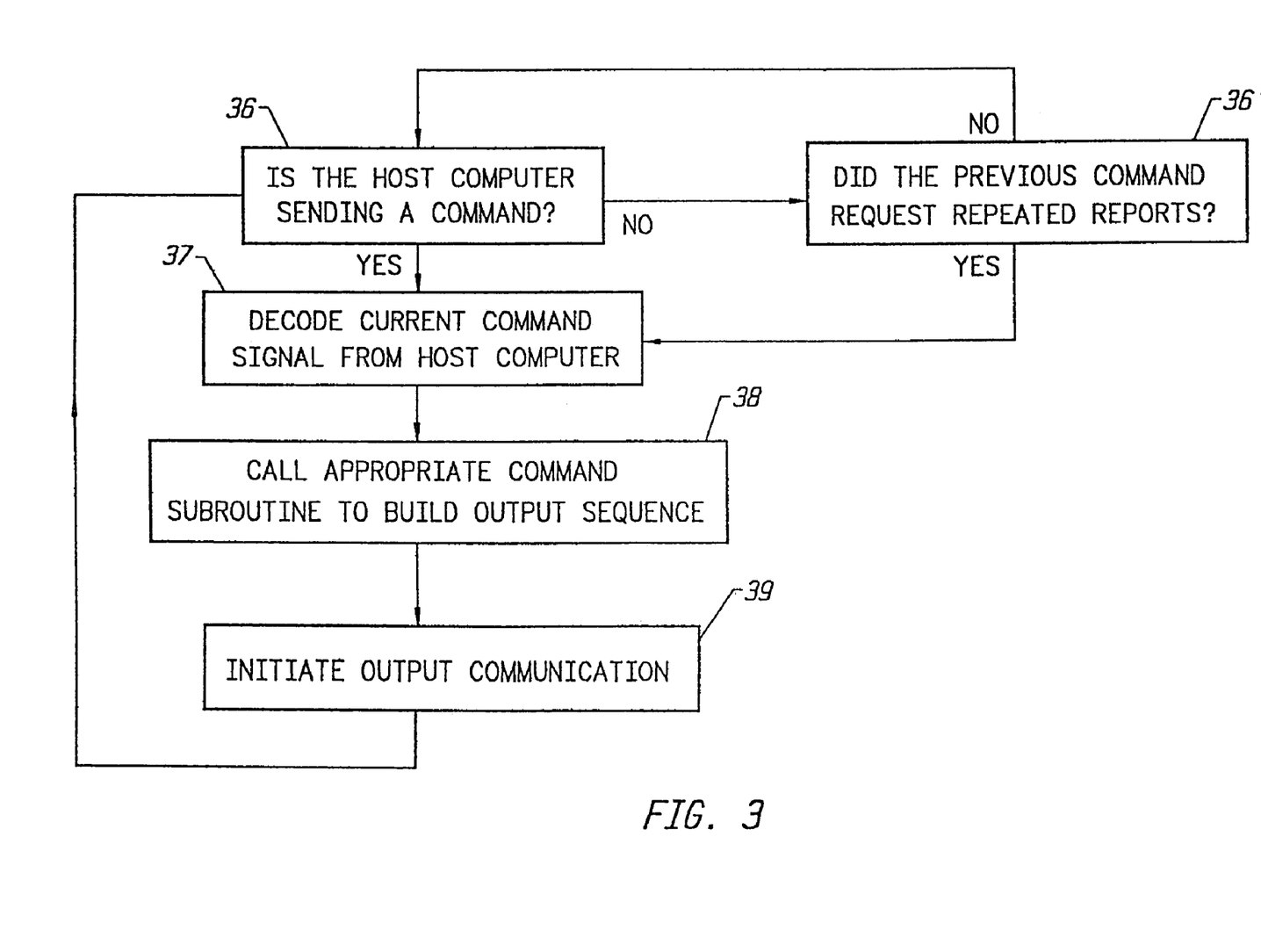
FIG. 3 is a flow chart describing the main software command loop for two different electronic hardware configurations shown in FIG. 2.

Referring to FIG. 3, the main command loop responds to the host computer 34 and runs repeatedly in an endless cycle. With each cycle, incoming commands 40 from the host computer are monitored 36 and decoded 37, and the corresponding command subroutines for reporting angles, thus stylus position and/or orientation (see FIGS. 4A and 4B), are then executed 38. Two possible subroutines are shown in FIG. 4A (single-chip method) and 4B (multi-chip method). When a subroutine terminates, the main command loop resumes 39. Available command will include but are not limited to: reporting the value of any single angle, reporting the angles of all six angles at one time, reporting the values of all six angles repeatedly until a command is given to cease aforementioned repeated reporting, reporting the status of peripheral buttons, and setting communications parameters. If the angle sensors require preprocessing, these commands will also include resetting the angle value of any single angle or otherwise modifying preprocessing parameters in other applicable ways. Resetting pre-processed angle values or preprocessing parameters does not require output data from the device. The microprocessor 32A or 32B simply sends appropriate control signals to the preprocessing hardware 13C, 13D, 16C, 16D, 19C, and 19D. If the microprocessor or floating-point processor is fast enough to compute stylus coordinates and orientation, these commands will also include reporting the stylus coordinates once, reporting the stylus coordinates repeatedly until a command is given to cease, and ceasing aforementioned repeated reporting, reporting the stylus coordinates and orientation once, reporting the stylus coordinates and orientation repeatedly until a command is given to cease, and ceasing aforementioned repeated reporting. If force reflection is supported, these commands will also include reporting the forces felt by any single joint, setting the resistance of any single joint, and locking or unlocking a joint.

Figure 4A:
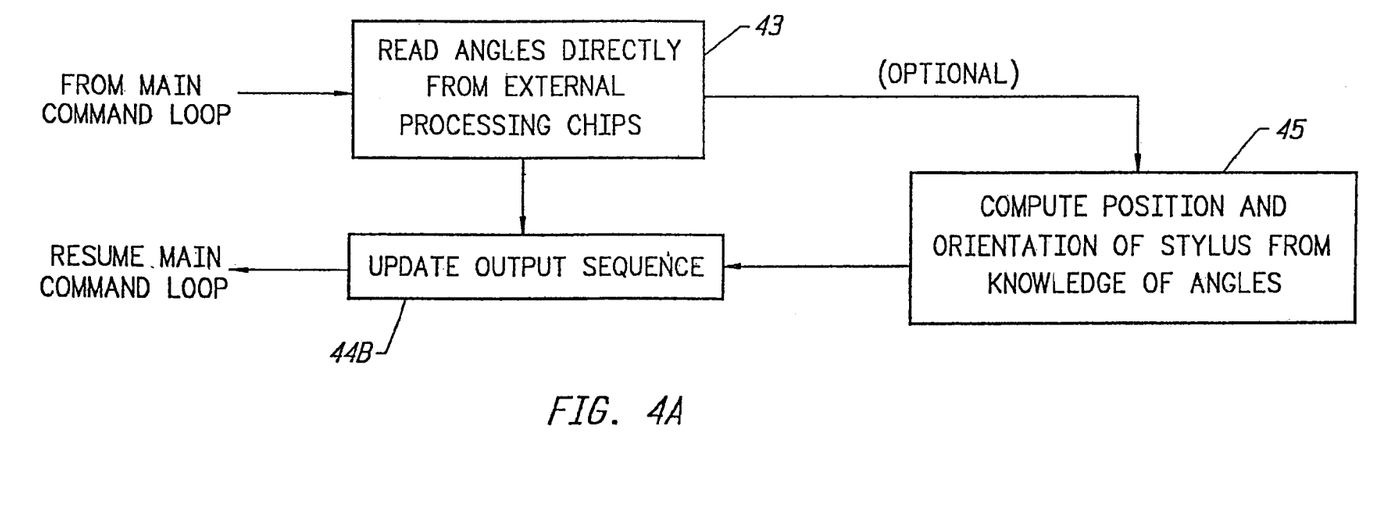
FIGS. 4A and 4B are flow charts describing two different interrupt service routines for serial output to host computer.
Figure 4B:
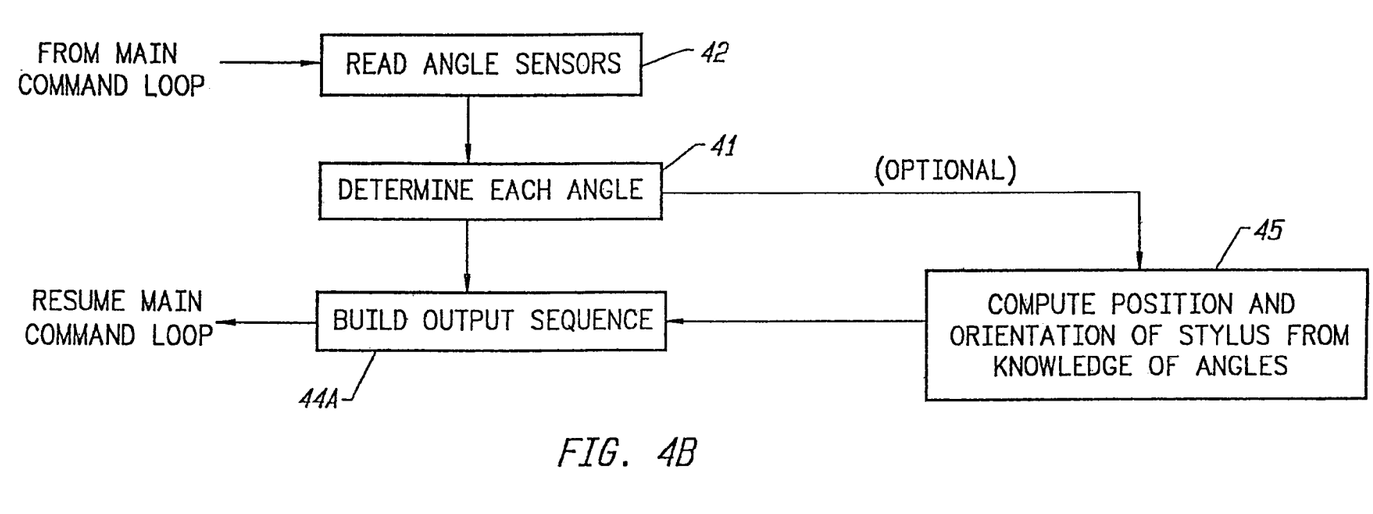

Any report by the subroutines of FIGS. 4A and 4B of a single angle value requires determining 41 the given joint angle. For the single-chip configuration shown in FIG. 2A, this subroutine directly reads the appropriate angle sensor 42 from among sensors 13A, 13B, 16A, 16B, 19A, and 19B. For the multi-chip configuration shown in FIG. 2B, this subroutine reads the outputs 43 of pre-processing hardware 13C, 13D, 16C, 16D, 19C, and 19D which have already determined the joint angles from the outputs of the sensors 13A, 13B, 16A, 16B, 19A, and 19B. Any report of multiple angles is accomplished by repeatedly executing the subroutine for reporting a single angle. The subroutine is executed once per angle, and the values of all angles are then included in the output sequence array. If the optional parts of the subroutines 45 are included, then these subroutines become the coordinate reporting subroutines. Many other command subroutines exist and are simpler yet in their high-level structure.

After determining the given joint angle, the microprocessor 32A or 32B creates an output sequence 44A or 44B by assembling an array in a designated area of processor memory 35 which will be output by the microprocessor's communications system at a given regular communications rate. The sequence will contain enough information for the host computer 34 to deduce which command is being responded to, as well as the actual angle value that was requested. Returning to FIG. 3, a query 36 in the main command loop asks whether the previous command requested repeated reports. If so, the main command loop is initiated accordingly. The communications output process (not shown) may be as simple as storing the output data in a designated output buffer, or it may involve a standard set of communications interrupts that are an additional part of the software. Setting communications parameters does not require output data from the device. The microprocessor 32A or 32B simply resets some of its own internal registers or sends control signals to its communications sub-unit.

To report the stylus' 11 coordinates, three of the five or six angle values are pre-read and knowledge of link lengths and device kinematics are incorporated to compute stylus 11 coordinates. These coordinates are then assembled in the output sequence array.

To report the stylus' 11 orientation, at least five angle values are read and knowledge of link lengths and device kinematics are incorporated to compute stylus 11 orientation. The orientation consists of three angles (not necessarily identical to any joint angles) which are included in the output sequence array.

Forces felt by a joint are reported, and setting a joint's resistance, and locking or unlocking a joint are accomplished by using interaction of the microprocessor 32A or 32B with force-reflecting hardware. Reporting forces felt by a joint uses a force sensor mounted on the joint and then places the resulting value in the output sequence array. To set a joint's resistance and lock or unlock a joint, control signals are used to control force-reflection hardware, and do not require any output data from the device.

Also contemplated in the present invention is computer software and hardware which will provide feedback information from the computer to the stylus, such as host commands 40 (shown in FIG. 1). This type of implementation is known in robotics and thus is easily incorporated into a system including the present invention. When a surface is generated on the computer screen, the computer will send feedback signals to the mechanical linkage which has force generators identified by numerals 13A, 13B, 16A, 16B, 19A, and 19B (which also identifies the sensors, see above) for generating force F (see FIG. 1) in response to the cursor position on the surface depicted on the computer screen. Force is applied for example, by added tension in the joints which is in proportion to the force being applied by the user and in conjunction with the image on the screen.

Figure 5:
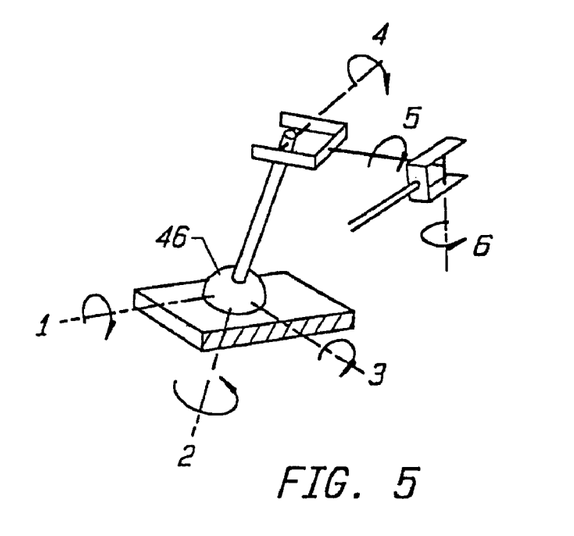
FIG. 5 is a perspective representation of another embodiment of the present invention.
Figure 6:
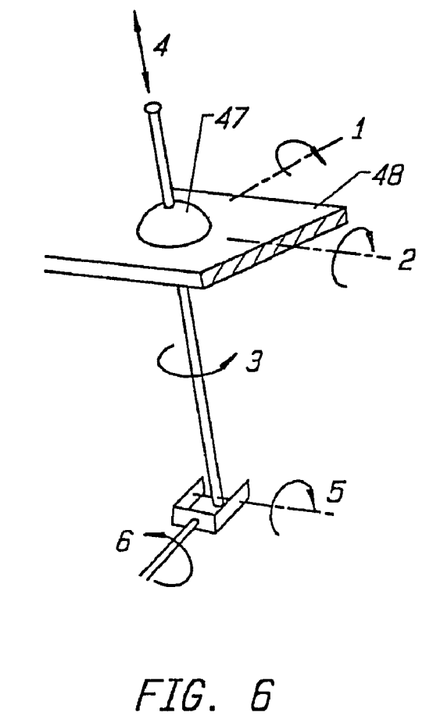
FIG. 6 is a perspective view of still another embodiment of the present invention.
Figure 7:
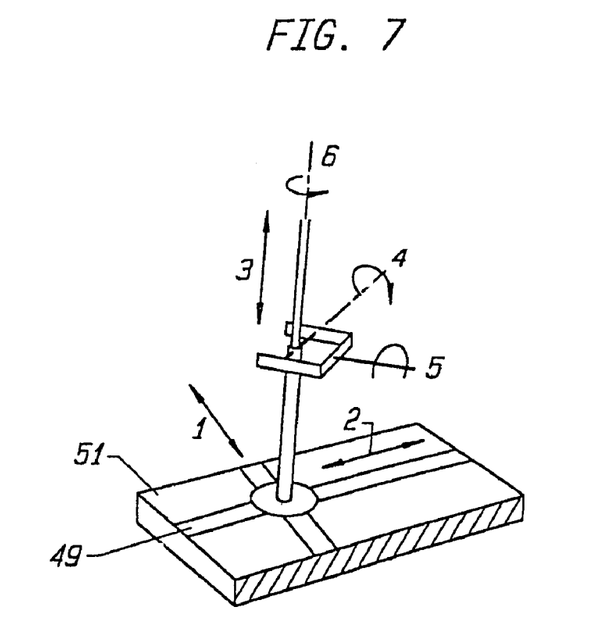
FIG. 7 is a perspective representation of another embodiment.
Figure 8:
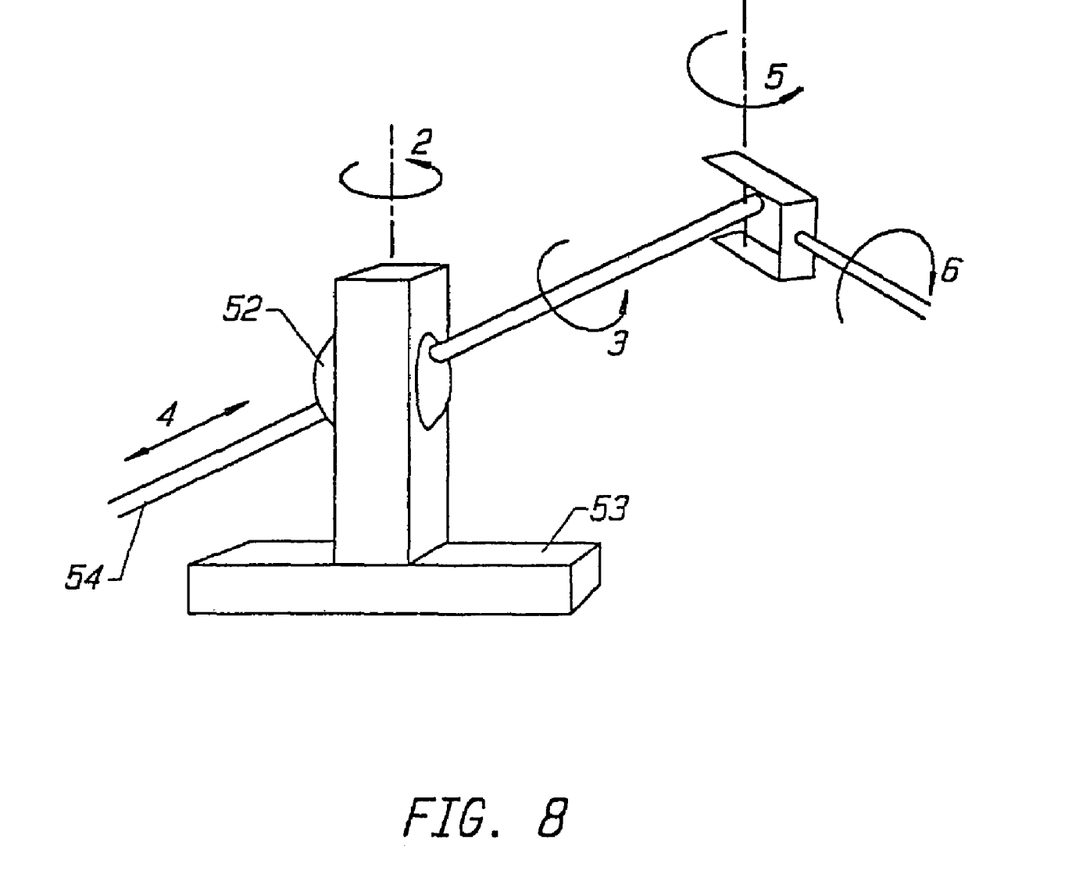
FIG. 8 is a perspective view of another embodiment.

The various configurations of the mechanical linkages shown in FIG. 5, FIG. 6, FIG. 7 and FIG. 8 which have different numbers of individual components and joints than shown in FIG. 1 are illustrative of the numerous possible configurations which can provide varying degrees of freedom inherent in the present invention. Referring to FIG. 5, FIG. 6 and FIG. 8, note that a rounded object such as a ball can act as a joint having motion in three degrees of freedom. In conjunction with other mechanical linkages and attachments, this permits sufficient degrees of freedom for the purposes of the present invention. In each figure, the orientation of the degrees of freedom of each joint is depicted by curved lines, numbered consecutively.

Briefly, FIG. 5 shows an embodiment having 6 rotary joints including a rounded joint 46 at the base such that three degrees of motion are available at that joint. FIG. 6 shows an embodiment having 5 rotary joints and one linear joint, including a three-dimensionally rotatable rounded joint 47 at the base through which one mechanical linkage can slide linearly and where the base is attached to a fixed surface 48 such that the surface does not prohibitively impede the movement of the device. FIG. 7 shows an embodiment having 3 rotary joints and 3 linear joints, where the basal connection can slide about the base in a two-dimensional plane in the cross configuration 49 on base 51. FIG. 8 shows an embodiment having 5 rotary joints and 3 linear joints, including three-dimensionally rotatable rounded joint 52 at a perpendicular projection from the base 53 through which one mechanical linkage 54 can slide linearly through the joint 52.

Figure 9:
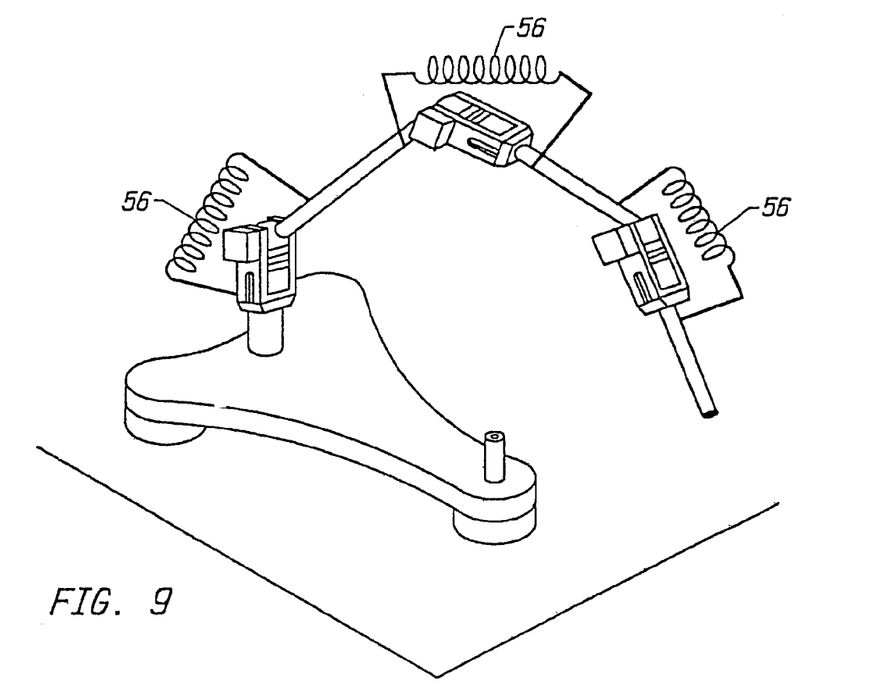
FIG. 9 shows an embodiment of the resistance mechanism of the present invention.
Figure 10:
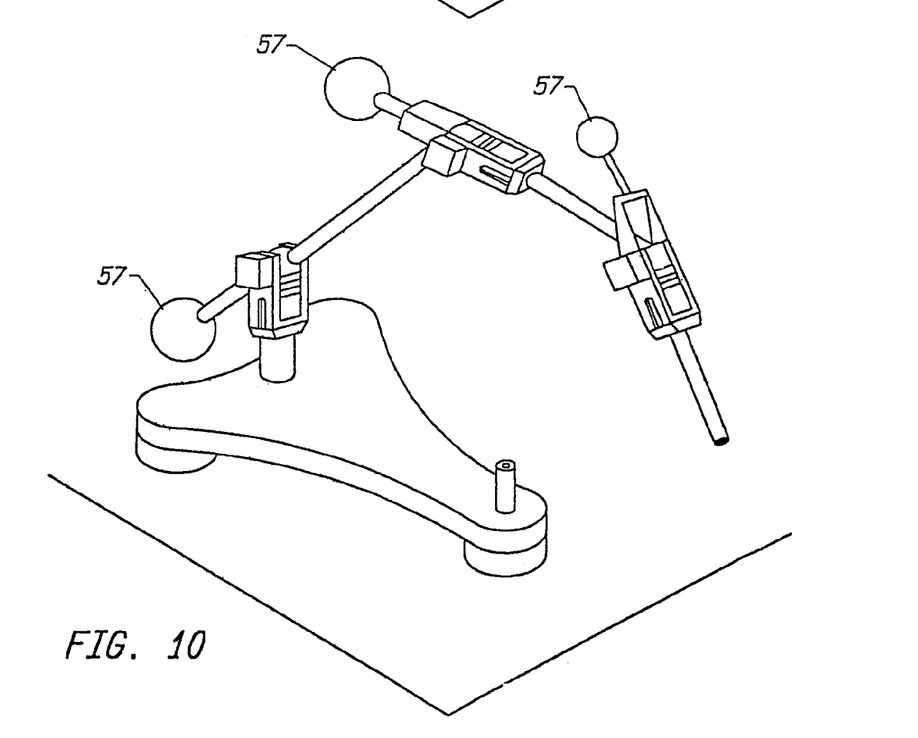
FIG. 10 shows another embodiment of the resistance mechanism.
Figure 11:
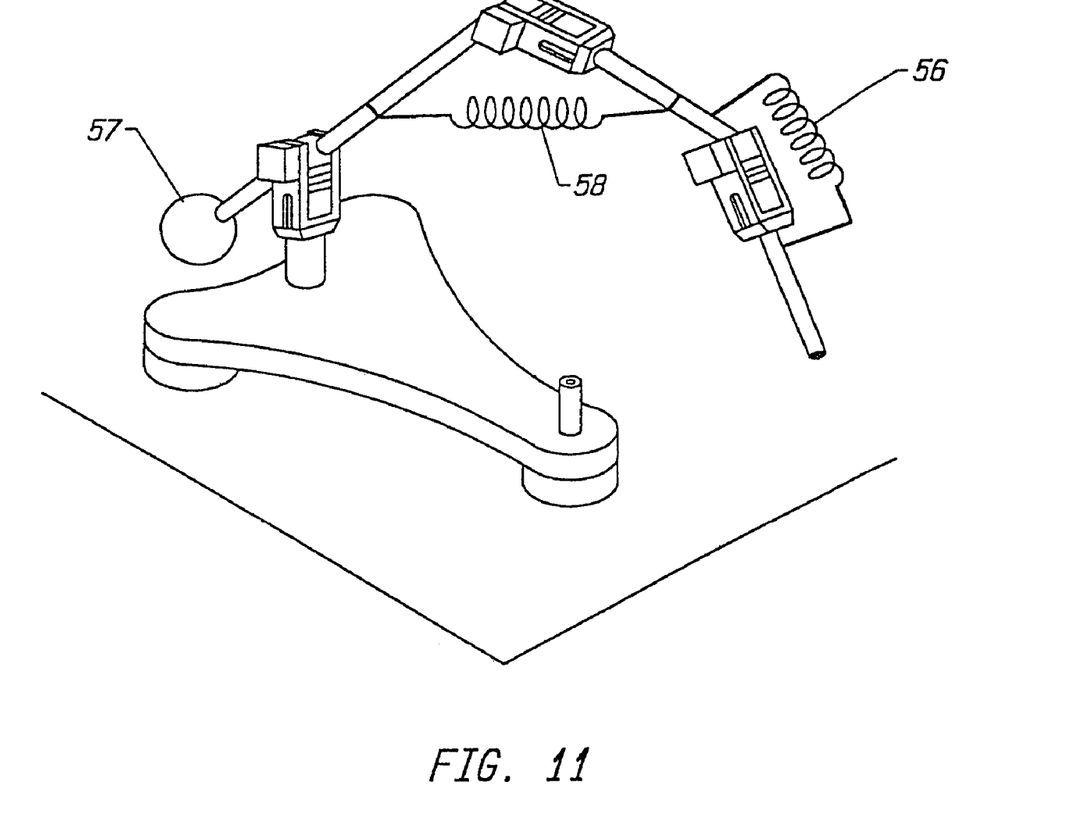
FIG. 11 shows yet another embodiment of the resistance mechanism.

While any of the above discussed configurations or others can be used in accordance with the present invention, FIGS. 9-11 show different mechanisms for providing resistance to the manual manipulation of the stylus by the user. FIG. 9, for example, shows return or tension springs 56 on each joint of the embodiment shown in FIG. 1. In an alternative embodiment, FIG. 10, shows counter-weights 57 on each joint. Moreover, FIG. 11, shows a combination of a return or tension spring 56, a counter-weight 57 and a compression spring 58. The arrangement of the resistance mechanism used should depend upon the configuration stylus mechanical linkage combination, such arrangement preferably chosen to maximize the ease with which the user can manipulate the stylus 11 in free space in accordance with the present invention.

What is claimed:

1. A human interface device comprising:
   an arm having a first end and a second end, the first end adapted to receive a user manipulatable object graspable by a user to operate the device and the second end coupled to a base, the arm having a plurality of linkages serially linked end to end with one another from the base, each linkage pivotably moveable with respect to an adjacent linkage via a joint to allow the user manipulatable object to be moved in a plurality of degrees of freedom with respect to a single point from the base; and
   a sensor coupled to the arm and configured to provide a locative signal associated with a position of the first end with respect to the base when the user manipulatable object is moved in at least one degree of freedom.

2. The device of claim 1 further comprising a force feedback generator coupled to the arm and configured to output a force in at least one of the plurality of degrees of freedom in response to receiving a force signal.

3. The device of claim 1 wherein the user manipulatable object is a stylus.

4. The device of claim 1 further comprising a host computer coupled to the sensor, the host computer having a computer display configured to produce a display image associated with the locative signal from the sensor.

5. The device of claim 1 wherein at least one of the joints is a rotary joint.

6. The device of claim 1 wherein at least one of the joints is a linear joint.

7. The device of claim 1, wherein the first end of the arm is moveable along a plurality of planar directions with respect to the base.

8. A computer executable software program include code having a set of instructions configured to perform a method, the method comprising:
   receiving a locative signal associated with a position of a user manipulatable object along a plurality of degrees of freedom, the user manipulatable object graspable by a user and coupled to a first end of an arm having a second end coupled to a base, wherein the arm includes a plurality of linkages end to end in a serial fashion, each linkage pivotably moveable with respect to one another via joints to allow the user manipulatable object to be moveable in the plurality of degrees of freedom with respect to a single point in the base; and
   outputting a signal in response to and corresponding with the locative signal.

9. The method of claim 8 wherein outputting the signal further comprises:

updating a display image on a graphical user interface of a computer display in response to movement of the user manipulatable object.

10. The method of claim 8 wherein outputting the signal further comprises:

outputting a force signal to a force generator at one or more joints at the arm in response to the locative signal, wherein the force generator applies a force to the one or more joints in response to receiving the force signal.

11. The method of claim 10 wherein the force signal is output by a host computer running the software program.

12. The method of claim 8 wherein outputting the signal further comprises:

updating a display image on a graphical user interface of a computer display in response to receiving the locative signal; and outputting a force signal to a force generator at one or more joints in the arm in response to the locative signal indicating at least a portion of the user manipulatable object is in virtual contact with a surface on the computer display.

13. The method of claim 8 wherein the user manipulatable object is a stylus.

14. The method of claim 8 further comprising:

sensing movement of the arm along at least one of the plurality of degrees of freedom; and outputting the locative signal in response to the sensed movement.

15. A device adapted for use in conjunction with a computer, the device comprising:

a user manipulatable object adapted to be grasped by a user;

means for allowing movement of the user manipulatable object in a plurality of degrees of freedom, the means for allowing including a plurality of linkages linked serially end to end and pivotably moveable with respect to one another via joints to allow the user manipulatable object to be moveable about a single point therefrom; and means for producing a locative signal corresponding with the position of the user manipulatable object, wherein the means for producing is adapted to send the locative signal to the computer.

16. The device of claim 15 wherein the user manipulatable object is a stylus.

17. The device of claim 15 further comprising means for outputting a force to the means for allowing movement to resist movement of the user manipulatable object in at least one degree of freedom in response to the locative signal.

18. The device of claim 15 further comprising means for sensing movement of the user manipulatable object in at least one degree of freedom, wherein the means for sensing produces the locative signal.

19. The device of claim 15 further comprising means for updating a display image on a computer display in response to movement of the user manipulatable object in at least one degree of freedom.

20. The device of claim 19 further comprising means for outputting a force to the means for allowing movement to resist movement of the user manipulatable object in at least one degree of freedom in response to the locative signal indicating the user manipulatable object is in virtual contact with a surface in the computer display.

* * * * *

UNITED STATES PATENT AND TRADEMARK OFFICE
CERTIFICATE OF CORRECTION

PATENT NO.         : 7,460,105 B2
APPLICATION NO.    : 11/332537
DATED              : December 2, 2008
INVENTOR(S)        : Rosenberg et al.

Page 1 of 1

It is certified that error appears in the above-identified patent and that said Letters Patent is hereby corrected as shown below:

In claim 32, column 10, line 9, replace "conesponding" with --corresponding--.

Signed and Sealed this

Fourteenth Day of April, 2009

JOHN DOLL
*Acting Director of the United States Patent and Trademark Office*